3,267,403
BLACK COATING FOR FRAGILE INFRARED RADIATION DETECTORS

Robert J. Guarnieri, Norwalk, Conn., assignor to Barnes Engineering Company, Stamford, Conn., a corporation of Delaware
No Drawing. Filed Sept. 4, 1963, Ser. No. 306,596
2 Claims. (Cl. 338—18)

This invention relates to an improved blackening for fragile, thin film infrared radiation detectors.

The problem of increasing the radiation absorption of infrared detectors is often a serious one. This is particularly true in the case of the far infrared, for example wavelengths of $15\mu$ to $35\mu$ and beyond. Many black coatings which are satisfactory for shorter wavelength infrared show unsatisfactory absorption in the far infrared.

Recently there has come on the market a black coating composition in the form of spheres of a silicon carbide in ranges up to $50\mu$ dispersed in a solution of an alkyd resin binder in a solvent such as xylene. This product is sold by the Minnesota Mining & Manufacturing Company under their name "3M Black Velvet Coating." This coating shows remarkable absorption in the far infrared, but as such has not been very satisfactory, because, if thin films are prepared by spraying or other means, the films are not continuous and if the film is made thick enough, for example about $50\mu$, the heat capacity of the infrared radiation detector is made excessive and so too long a time constant results.

In the copending application of Karlson and Kiernan, Serial No. 294,145, filed July 10, 1963, there is described a satisfactory black coating for far infrared which is prepared by wet ball-milling the commercial product described above, reducing the pigment particles to a size substantially in the range of $5-25\mu$, and then redispersing the product in solvent to the desired consistency. This improved coating has proven to be extremely satisfactory for the coating of infrared radiation detectors, for example, the standard oxide thermistors, and has made possible bolometers using such detectors which are sensitive in the far infrared. The product of the Karlson and Kiernan application has constituted a very satisfactory solution to the problem of a black for oxide thermistors. These thermistors are usually of moderate thickness, and formed, of course, conventionally of oxides of manganese, nickel, etc. These thermistors have appreciable thickness, for example up to $5\mu$ and more, and can be coated with the black coating by conventional spraying means using a nitrogen spray.

A new type of thermistor is described and claimed in the patent to De Waard, No. 2,994,053, July 25, 1961. These thermistors are very thin films of germanium or silicon, for example, films of from $.3\mu$ to $1\mu$. Many advantages result from the thin film thermistors, such as the possibility of very short time constants, or high responsivity if the time constant is lengthened. However, the thin films are substantially transparent throughout a long range of the infrared, and, in the case of silicon, even on to the far infrared of $35\mu$ and the like. As a result, an absorptive coating is essential, as otherwise infrared radiation goes right through the thin film thermistor and does not heat it up.

No problem is presented in blackening the thin film germanium and silicon thermistors for the shorter wavelength infrared. Black coatings which have quite soft pigments are easily applied, either by spraying, brushing, or the like. In the far infrared, however, there is a different story. The Karlson and Kiernan silicon carbide coating cannot be used practically. If it is attempted to spray it onto the thin germanium or silicon films, the film is physically injured, for the silicon carbide pigment particles are extremely hard abrasives. Brushing on has also not proven to be satisfactory, and there was left a serious problem of a good black absorbent coating in the far infrared for thin film thermistors. It is with a solution to this problem that the present invention deals.

I have found that a film of the commercial "3M Black Velvet Coating" or of the improved Karlson and Kiernan black coating can be sprayed onto a flat substrate such as polished glass on which there has been formed a thin film of material soluble either in the solvent for the black coating to a greater extent than the binder itself, or some other solvent in which the coating binder is not soluble. After the film has been sprayed on, it is dried, and then the substrate, such as a thin glass plate, is immersed in solvent for a period of time sufficient to dissolve partially or wholly the thin film placed on the substrate without seriously affecting the binder of the black coating film in the case of a solvent in which this binder has some solubility. The film of the black coating then floats off from the substrate, and after decantation of the solvent and drying, constitutes a thin film of sufficient strength so that it can be cemented onto thermistors such as thin film germanium and silicon thermistors by means of any suitable adhesive. It should be noted that when a small piece of the film of coating prepared as described above is cemented onto a thin film thermistor there is no mechanical destruction of the thermistor, and a satisfactory blackened detector results. Thus, for the first time, practical thin film germanium and silicon thermistor bolometers are made suitable for use in the far infrared where they were not very effective in the past because of the lack of a suitable black coating.

It should be noted that while the present invention is of primary importance with thin film germanium and silicon thermistors, it may be used on any infrared radiation detector, such as an oxide thermistor, or even other types of radiation detectors which are sensitive to the far infrared. However, since ordinary oxide thermistors can be readily coated with the silicon carbide black by spraying, the advantage of the present invention with such thermistors is not nearly as great as in the case of thin film germanium and silicon thermistors which cannot be coated by this method. Therefore, although the invention includes oxide thermistors and other detectors coated with a silicon carbide black by the present invention, this is not the most important field, because useful effects can be obtained by other means.

It should be noted that the present invention is essentially one of forming a film which is then cemented onto the thermistor. This does not remove the inherent drawbacks to the "3M Black Velvet Coating" due to its large particle size. It is not possible to produce very thin films, that is to say, films much thinner than $50\mu$, from this coating because if it is attempted to produce very thin films they are not uniform, due to the large size of many of the pigment particles, and so a high absorption black cannot be produced practically. The present invention is equally useful with the improved coating composition of the Karlson and Kiernan application, and in such a case, thin films can be produced which have sufficiently low heat capacity for use in high responsivity thin film germanium or silicon thermistor bolometers. The present invention is, of course, useful with the old coating having large particle sizes, but it does not improve the thickness characteristics or uniformity characteristics of this coating, and therefore, the present invention is particularly useful with the Karlson and Kiernan coatings, where thin films can be produced which are uniform. This constitutes the preferred modification of the present invention.

It is an advantage of the present invention that it is not limited to any particular film coating on the substrate.

A very satisfactory coating is a thin film of polystyrene which is applied from xylene solution, and which can be dissolved or loosened by a brief immersion in xylene. The immersion should not be too long, 5 to 10 minutes being adequate, as very long immersion will, of course, soften the binder of the black coating film. Other coatings can be water-soluble film-forming materials which can then be floated off in water, in which, of course, the binder of the black coating film is entirely insoluble. Other films which dissolve readily in other solvents such as alcohols, alcohol-ether mixtures, and the like may be used.

Essentially the thin film is a means for permitting separation of the coating film from the substrate without damage, and it, itself, is therefore not particularly critical, except, of course, that it must not react adversely with the film of silicon carbide coating. When organic solvent soluble films, such as polystyrene, are used, there is the additional advantage that some of the film may remain adhering to the surface of the silicon carbide coating film, and to that extent may serve as part or all of the cementing material for attaching the films to the thermistors. Since even films of materials such as polystyrene, which require an aromatic hydrocarbon solvent, such as xylene, can readily be used because of the greatly different rate at which the polystyrene is dissolved or softened by the xylene solvent, it is not necessary to go to extremes in choosing a film which is dissolved by solvents which do not attach the silicon carbide coating film at all. The wide choice of films to be put on the substrate is a practical advantage of the present invention.

It is possible to make fairly large pieces of the film by means of the present invention, for example, pieces 10 x 15 mm. or even larger. These films can be cut into suitable small pieces for cementing onto small thermistors, and such a method is practically useful and is included in one aspect of the present invention. However, there is an advantage in making the pieces of film the proper size for application to the thermistors in the first place. This can be done by placing a suitable mask on the film-coated substrate and spraying on the silicon carbide coating composition through the apertures in the mask. Of course in this case when the film on the substrate is dissolved out by immersion in the solvent, a large number of small pieces of black film are produced. The cutting step which is necessary where larger pieces of film are produced is eliminated, but at some cost of less easy handling of the very small pieces which are prepared through openings in a mask. In general, the smaller pieces present more advantages than disadvantages.

The thickness of the films produced in the present invention is limited only by the characteristics of the binder and the particle size. As pointed out above, it is not practical to produce uniform very thin films with larger pigment particle sizes. Therefore, it is desirable to produce as thin a film as possible from the improved coating composition of the Karlson and Kiernan application. The limit of thinness of the film, of course, is reached when the film is no longer uniform. In general, the film shows adequate strength with careful handling in as thin films as is permitted by the pigment particle size. With the coating compositions having the largest pigment particle size permissible under the Karlson and Kiernan application, namely $25\mu$, the film will lose its uniformity when the thickness gets much lower. If the process of the Karlson and Kiernan application is carried out further, and the largest pigment sizes are still smaller, thinner films, for example of the order of $8-10\mu$, may readily be produced.

The very small pieces of film produced by the present invention require precision handling, but this is no manufacturing drawback, as the production of oxide thermistor bolometers at present is carried out under a low powered microscope. The present invention, therefore, requires precise and careful work, but does not increase difficulties to a point where manufacturing efficiency is adversely affected. The quality of thermistors or thermistor bolometers produced by the present invention is uniformly high when the proper and customary care is used.

The invention will be described in greater detail in conjunction with the following specific examples:

*Example 1*

A substrate, preferably polished glass, is coated with a thin uniform film of polystyrene from a solution of the polystyrene in xylene. The film is then sprayed with "3M Black Velvet Coating" solution using nitrogen as a spray gas until a film of approximately $50\mu$ is obtained. The film is dried and then the glass substrate is immersed in xylene and gently moved around for about five minutes. The polystyrene is dissolved or loosened, and the black film coating floats off. The xylene is then removed, for example by suction with an eyedropper or other suitable means, and the resulting film of the black pigment dried. The film keeps well, and can then be applied to thermistors.

Preferably the film is first cut into suitable sizes while it is still flexible and slightly damp, and applied to a thin film germanium or silicon themistor bolometer of the type described in the De Waard patent. A typical thermistor size, and therefore coating size, is 0.5 x 0.5 mm. The resulting thermistor bolometers show excellent absorption in the infrared, even as far out as $35\mu$, but they are slow, because the heat capacity of the rather thick black coating increases the time constant of the bolometer.

*Example 2*

The procedure of Example 1 is repeated as far as the coating of the glass substrate with the polystyrene is concerned. Then a mask is applied with small openings of the size desired for the final pieces of black film. A solution of the silicon carbide black prepared according to the Karlson and Kiernan application by wet ball-milling down to a particle size not in excess of $25\mu$, is sprayed on through the openings in the mask. The mask is then removed, the small areas of black film dried, and the whole floated off from the glass substrate by immersion in xylene as described in Example 1. Small pieces of film of approximately $12\mu$ result, and can be attached by cementing to thin film germanium or silicon thermistors as described in connection with the cut film pieces in Example 1. Superior thermistor bolometers result, because the thin film permits a shorter time constant with adequate responsivity.

I claim:

1. A thin film germanium thermistor not over $1\mu$ thickness having cemented thereon a preformed uniform film comprising silicon carbide pigment particles in a resin binder.

2. A thermistor according to claim 1 in which the pigment particle sizes are substantially in the range of $5-25\mu$.

References Cited by the Examiner

UNITED STATES PATENTS

| | | | |
|---|---|---|---|
| 1,444,519 | 2/1923 | Norton | 264—309 |
| 1,690,114 | 11/1928 | Hopkinson | 264—309 |
| 2,278,146 | 3/1942 | Moeller | 161—206 |
| 2,329,179 | 9/1943 | Beh | 161—206 |
| 2,994,053 | 7/1961 | De Waard | 338—18 |

OTHER REFERENCES

Hesse: "Siliciumcarbid," Fette and Seifer, vol. 55, No. 10 (1953), p. 723.

RICHARD M. WOOD, *Primary Examiner.*

H. T. POWELL, W. D. BROOKS, *Assistant Examiners.*